United States Patent
Allmandinger et al.

(10) Patent No.: US 7,121,972 B2
(45) Date of Patent: Oct. 17, 2006

(54) ADJUSTABLE FLANGE DEVICE FOR COVER MEMBER IN DRIVE AXLE ASSEMBLY

(75) Inventors: Timothy Bernard Allmandinger, Roanoke, IN (US); Sean Karl Hoefer, Wabash, ID (US); Gregory James Maser, Fort Wayne, ID (US); Parvinder Singh Nanua, Fort Wayne, ID (US); Edward Eugene Stuart, Payne, OH (US); Earl James Irwin, Fort Wayne, ID (US)

(73) Assignee: Torque-Traction Technologies, Inc., Maumee, OH (US)

( * ) Notice: Subject to any disclaimer, the term of this patent is extended or adjusted under 35 U.S.C. 154(b) by 184 days.

(21) Appl. No.: 10/695,958

(22) Filed: Oct. 30, 2003

(65) Prior Publication Data
US 2005/0096173 A1 May 5, 2005

(51) Int. Cl.
*F16H 48/06* (2006.01)
(52) U.S. Cl. ........................... 475/230; 277/637
(58) Field of Classification Search ........... 475/220, 475/230, 248; 277/598, 609, 616, 637
See application file for complete search history.

(56) References Cited

U.S. PATENT DOCUMENTS

| 2,393,779 | A | | 1/1946 | Hunter |
| 2,552,689 | A | | 5/1951 | Peeps, Jr. et al. |
| 4,423,878 | A | | 1/1984 | Escue |
| 4,815,337 | A | * | 3/1989 | Peloquin ............... 475/160 |
| 5,013,050 | A | * | 5/1991 | Curtis .................... 29/235 |
| 5,547,430 | A | * | 8/1996 | Gasch .................... 475/89 |
| 5,794,476 | A | | 8/1998 | Smietanski |
| 6,039,320 | A | * | 3/2000 | MacDonald ........... 277/370 |
| 6,093,127 | A | * | 7/2000 | DiDomenico et al. ... 475/230 |
| 6,146,304 | A | * | 11/2000 | Bendtsen ............... 475/230 |
| 6,186,510 | B1 | | 2/2001 | Reagan |
| 6,217,028 | B1 | | 4/2001 | Wilke |
| 6,328,667 | B1 | * | 12/2001 | Otaki et al. ........... 475/84 |
| 6,729,207 | B1 | * | 5/2004 | Allmandinger et al. ... 74/607 |
| 6,813,972 | B1 | * | 11/2004 | Guo ..................... 74/606 R |

FOREIGN PATENT DOCUMENTS

| FR | 2 667 918 A | | 4/1992 | |
| JP | 1-203739 | * | 8/1989 | ............ 475/230 |
| JP | 6-227272 | * | 8/1994 | ............ 475/230 |
| WO | WO 03/080366 A | | 10/2003 | |

* cited by examiner

*Primary Examiner*—Ha Ho
(74) *Attorney, Agent, or Firm*—Berenato, White & Stavish

(57) ABSTRACT

A drive axle assembly for a motor vehicle comprises a support beam member, a differential assembly module secured to the support beam member and a cover member fastened to the support beam member to cover at least a portion the differential assembly module. The cover member includes two spaced access openings with adjustable sealing flange devices for sealing an interior cavity within the cover member between the access openings and corresponding axle shaft members. The sealing flange device is positionally adjustable relative to the cover member. A method for adjusting position of the sealing flange device relative to the cover member comprises the steps of securing the cover member to the axle support member, mounting the sealing flange device to the cover member, adjusting the position of the sealing flange device relative to the cover member and securing the sealing flange device to the cover member.

19 Claims, 12 Drawing Sheets

ADJUSTABLE FLANGE DEVICE FOR COVER MEMBER IN DRIVE AXLE ASSEMBLY

BACKGROUND OF THE INVENTION

1. Field of the Invention

The present invention relates to drive axle assemblies for motor vehicles in general, and more particularly to an adjustable flange device mounted to a cover member of the drive axle assembly.

2. Description of the Prior Art

Rigid drive axle assemblies are well known structures that are in common use in most motor vehicles. Such axle assemblies include a number of components that are adapted to transmit rotational power from an engine of the motor vehicle to wheels thereof. Typically, the rigid drive axle assembly includes a hollow axle housing, a differential, which is rotatably supported within the axle housing by a non-rotating carrier. The differential is connected between an input drive shaft extending from the vehicle engine and a pair of output axle shafts extending to the vehicle wheels. The axle shafts are contained in respective non-rotating tubes that are secured to the carrier. Thus, rotation of the differential by the drive shaft causes corresponding rotation of the axle shafts. The carrier and the tubes form a housing for these drive train components of the axle assembly, inasmuch as the differential and the axle shafts are supported for rotation therein.

The axle housings are generally classified into two basic types. The first axle housing type is a unitized carrier construction, commonly referred to as a Salisbury type axle assembly, illustrated in FIG. 1. In this structure, the Salisbury type axle assembly 301 includes a carrier 312 (which houses the rotatable differential mechanism 340) is directly connected to the two tubes 316 and 317 (which house the rotatable axle shafts 320). An opening is provided at the rear of the carrier to permit assembly of the differential therein. A cover 326 closes this opening during the use. The cover 326 is connected by bolts (not shown) to a rear face 330 of the carrier 312 hydraulically seals the housing against the passage of lubricant. A brake assembly 314 located at the end of a tube 316 extending outboard from the ends of the carrier 312. Located within the carrier 312 is a drive pinion 332 rotatably supported by a rear drive pinion bearing 334 and a front drive pinion bearing (not shown) supported on the inner surface of a portion of the axle carrier casing 338 that extends forward from the center line of the axle assembly. A driveshaft, driveably connected to the output shaft of a transmission, is coupled to the shaft of the drive pinion 332. The differential mechanism 340, located within the differential case 348, includes a ring gear 342, in continuous meshing engagement with drive pinion 332 and supported rotatably on the differential rear drive pinion bearing 334 and the front drive pinion bearing located within the housing gear and cylindrical extension 338 of the carrier 312. The axle carrier 312 also includes laterally directed tubular extensions 344, 346, which receive therein the ends of housing tubes 316 and 317, respectively. Located within the carrier 312 is a differential case 348, on which bevel pinion gears 350, 352 are supported for rotation on a differential pinion shaft 354. Side bevel gears 356, 358 are in continuous meshing engagement with pinions 350, 352 and are driveably connected to left and right axle shafts 320, located respectively within tubes 316 and 317. The axle shaft 320 is connected to the corresponding side bevel gear 356. Unitized carrier axle housing constructions of this type are economical to manufacture and are readily adaptable for a variety of vehicles.

The second axle housing type is a separable carrier construction, and is commonly referred to as a Banjo type axle, illustrated in FIG. 2. In this structure, the Banjo type axle 401 includes an axle housing 402 having axle tubes 406a and 406b connected together by a central member 404. The axle tubes 406a and 406b are adapted to receive and rotatably support output axle shafts 414a and 414b. The axle housing 402 is formed separate and apart from a carrier 422. This central member 404 is generally hollow and cylindrical in shape, having a large generally circular opening 410 formed therethrough. During assembly, a differential 420 is first assembled within the carrier 422, then the carrier 422 is secured to the central member 404 of the axle housing 402. The overall shape of this type of axle housing (i.e., the generally round shape of the central member 404 and the elongated tubes 406a and 406b extending therefrom) generally resembles the shape of a banjo musical instrument. Hence, this type of axle housing is referred to as the Banjo type axle housing. The Banjo type axle housings are advantageous because the carrier 422 and differential 420 can be removed from the axle assembly 401 for service without disturbing the other components thereof.

However, both Banjo and Salisbury type axles have their disadvantages. Thus, there is a need for a rigid drive axle assembly that combines the advantages of both Banjo and Salisbury type axles and lessens their shortcomings.

SUMMARY OF THE INVENTION

The present invention provides a novel adjustable flange device mounted to a cover member of a drive axle assembly for motor vehicles. It will be appreciated that the present invention is equally applicable to independent drive axle assemblies, and may be used for both front and rear axle applications.

The drive axle assembly in accordance with the present invention comprises a support beam member, a differential assembly module secured to the support beam member, a pair of axle shaft members outwardly extending from said differential assembly member, and a cover member fastened to the support beam member to cover at least a portion the differential assembly module. The cover member, in turn, includes two coaxially spaced access openings therein each provided with an adjustable sealing flange device provided to receive one of the axle shaft members therethrough and to seal an interior cavity within the cover member between one of the access openings and corresponding one of the axle shaft members. Moreover, the adjustable sealing flange device is positionally adjustable relative to the cover member. Preferably, the cover member is a rear cover secured to a rear mounting surface of the support beam member to at least partially cover the differential assembly module.

In accordance with the preferred embodiment of the present invention, the adjustability of the device is achieved by providing the sealing flange device with oversized mounting holes which are substantially larger in diameter than holes in the cover member of the drive axle assembly allowing free movement of the sealing flange device about fasteners mounting the sealing flange device to the cover member in order to enable positional adjustment of the sealing flange device relative to the cover member, thus achieving a desired relative position of the sealing flange device and the cover member.

A method for adjusting a position of the sealing flange device comprises the steps of securing the differential assembly module to the axle support beam member, securing the cover member to the axle support beam member, mounting the adjustable sealing flange device to the cover member, adjusting the position of the sealing flange device relative to the cover member, and securing the sealing flange device to the cover member in the position as set up in the previous step. Preferably, the step of adjusting the position of the sealing flange device relative to the cover member includes aligning a central axis of the sealing flange device to a central axis of the axle shaft member.

Therefore, the adjustable flange device and the method for adjusting the same in accordance with the present invention represents a novel arrangement providing extended differential bearing life and proper sealing of the differential assembly module, ease of manufacturing and reduced manufacturing cost, ease of assembly/disassembly of the axle assembly, and improved modularity and commonality of axle components.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings. As used herein, the words "front" and "rear" in the following description are referred with respect to a driving direction of a motor vehicle, as indicated in the accompanying drawing figures by an arrow F.

Figure 1:
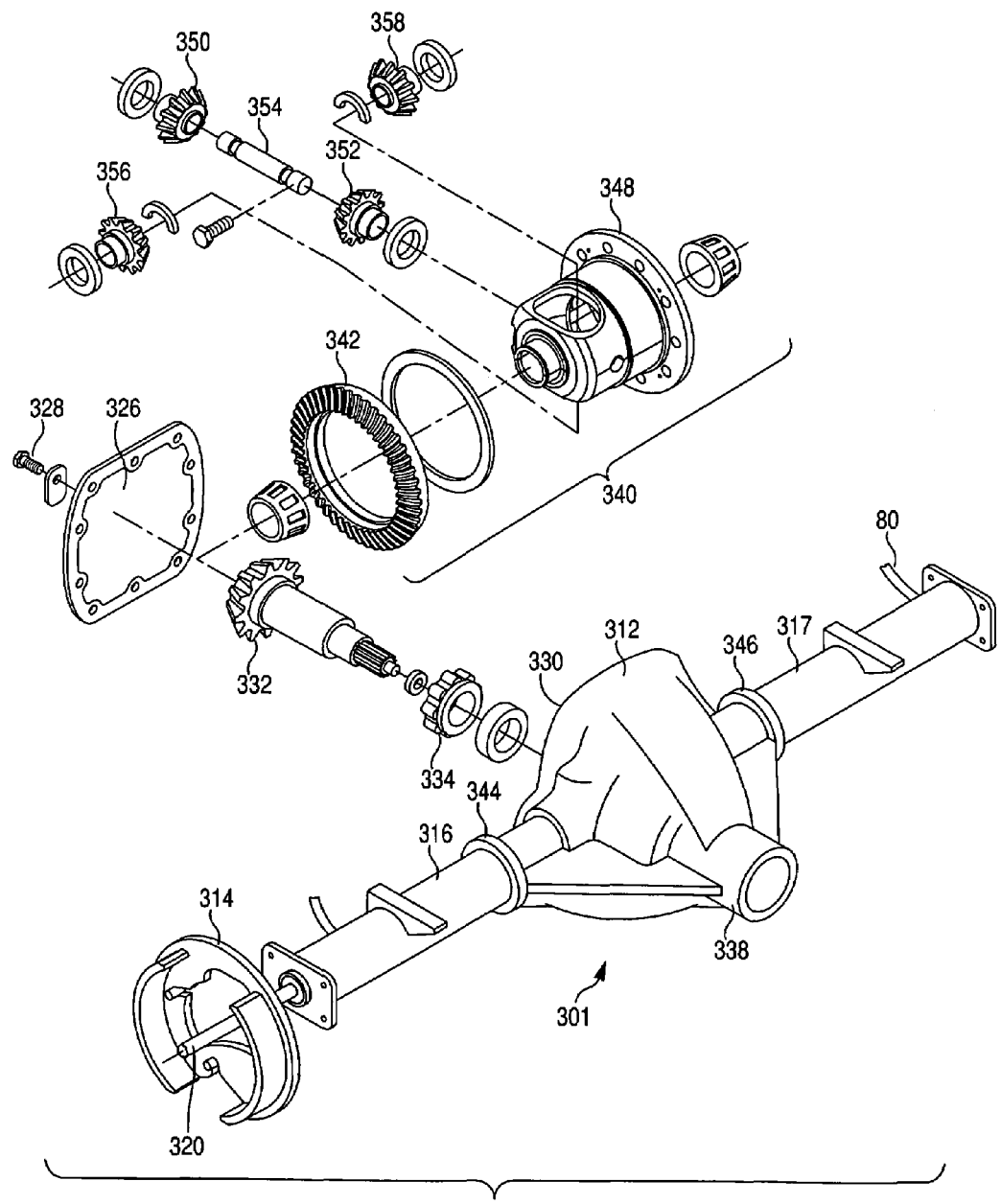
FIG. 1 is an exploded perspective view of a typical Salisbury type drive axle assembly of the prior art.
Figure 2:
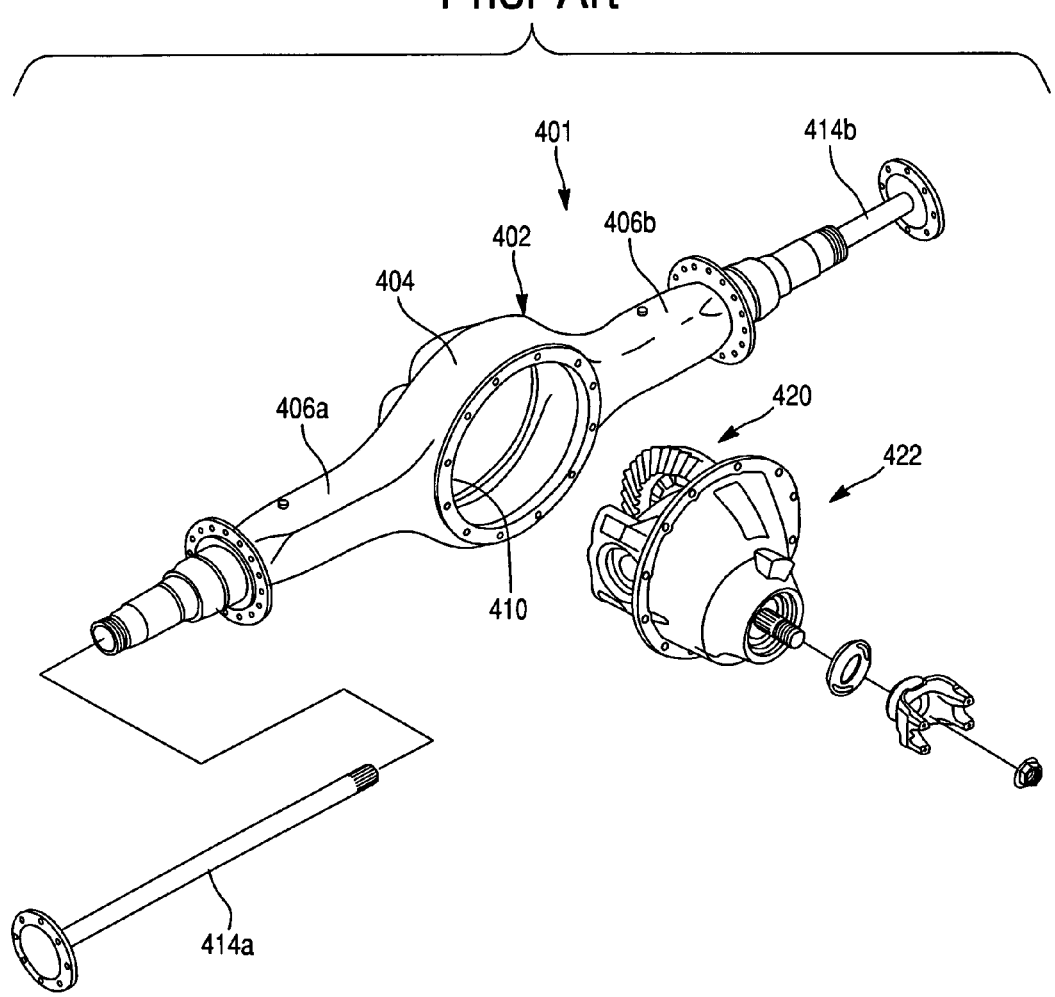
FIG. 2 is an exploded perspective view of a typical Banjo type drive axle assembly of the prior art.
Figure 3:
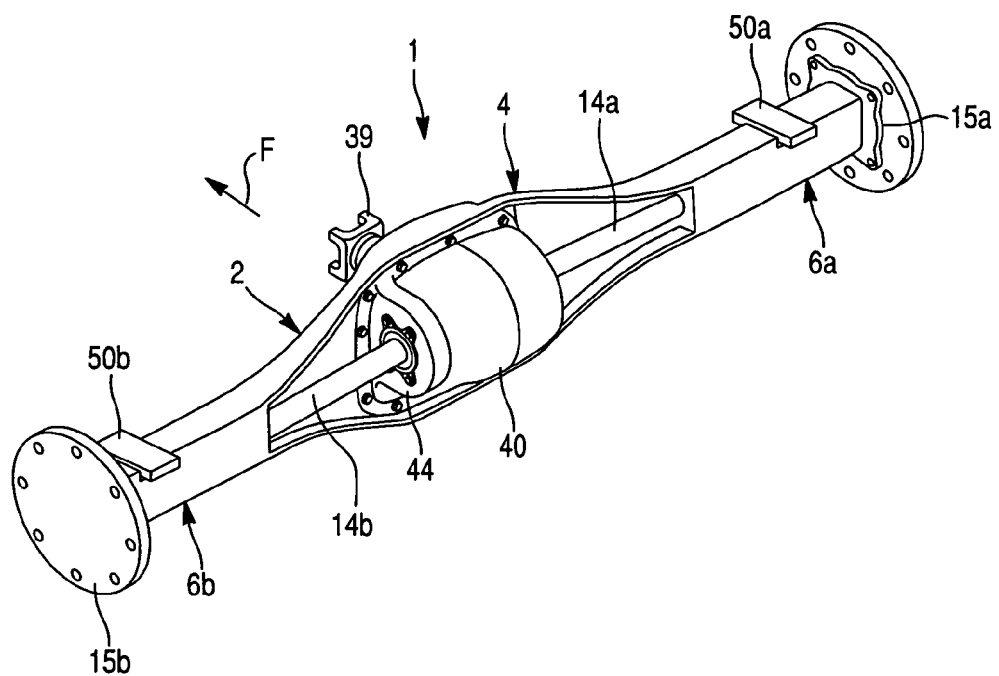
FIG. 3 is a perspective view from the rear of an axle assembly in accordance with the present invention.
Figure 4:
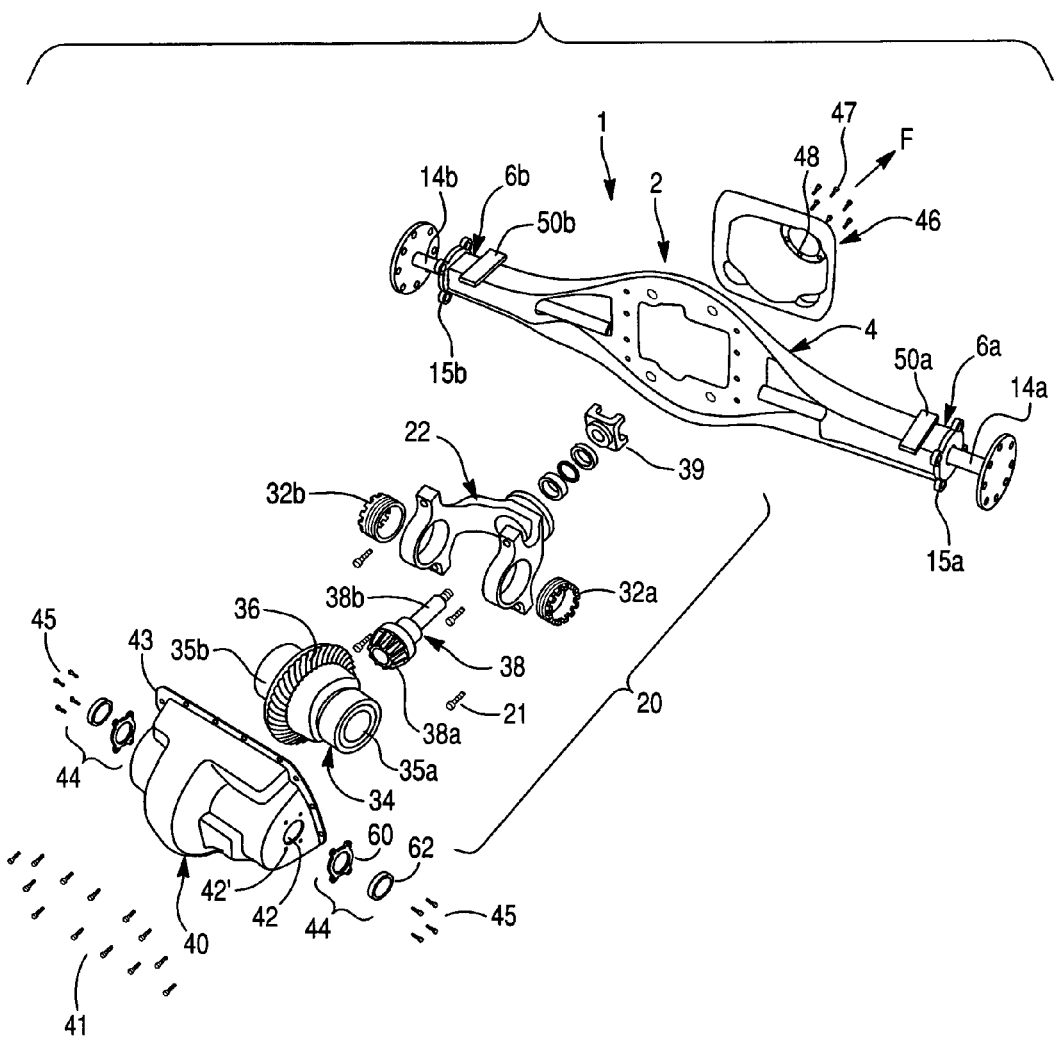
FIG. 4 is an exploded perspective view from the rear of the axle assembly in accordance with the present invention.
Figure 5:
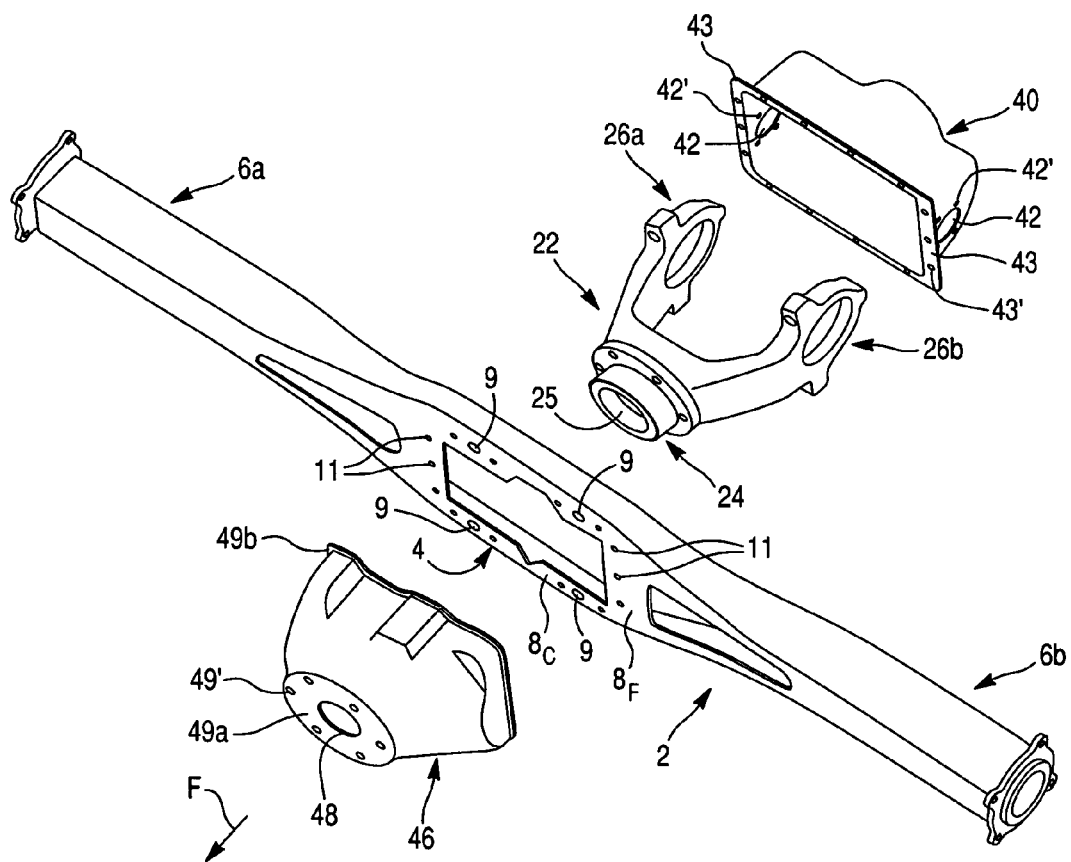
FIG. 5 is a partial exploded perspective view from the front of the axle assembly in accordance with the present invention.

FIGS. 3–5 depict a vehicle rigid drive axle assembly 1 in accordance with the first exemplary embodiment of the present invention. It will be appreciated that the present invention is equally applicable to an independent drive axle assembly, and may be used for both front and rear axle applications.

The rigid drive axle assembly 1 comprises a support beam member 2 having a substantially flat, enlarged central plate section 4 and two opposite, substantially tubular arm sections 6a and 6b axially outwardly extending from the central plate section 4. As illustrated, the flat central plate section 4 of the support beam member 2 is in the form of a substantially vertically oriented flat plate and defines a support plane that is substantially orthogonal to the driving direction F of the motor vehicle. Preferably, the arm sections 6a and 6b are formed integrally with the central plate section 4. The opposite arm sections 6a and 6b of the support beam member 2 may be provided with spring seats 50a and 50b, respectively.

The drive axle assembly 1 further comprises a differential assembly module 20 fastened to the enlarged central plate section 4 of the support beam member 2, and two opposite axle shaft members 14a and 14b outwardly extending from the differential assembly module 20, and rotatably supported by the arm sections 6a and 6b of the support beam member 2 so that the axle shaft members 14a and 14b are spaced from the central plate section 4 of the beam member 2 in the driving direction F of the motor vehicle. Distal ends of the axle shaft members 14a and 14b are provided with flange members 15a and 15b, respectively, adapted for mounting corresponding wheel hubs (not shown).

Figure 8:
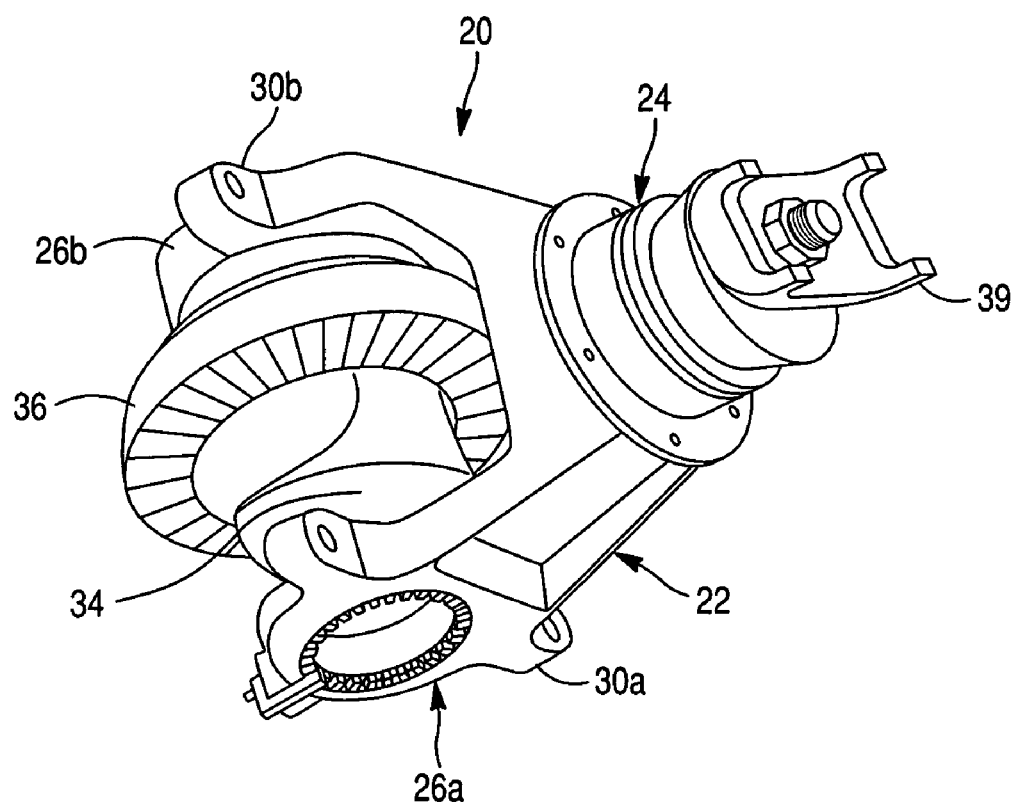
FIG. 8 is perspective view of a differential assembly module in accordance with the present invention.

The differential assembly module 20 shown in FIGS. 4 and 8, includes a differential carrier frame member 22 fastened to the central plate section 4 of the beam member 2, and provided for rotatably supporting a differential case 34 and a drive pinion 38. The differential case 34 houses a differential gear mechanism, well known to those skilled in the art. The drive pinion 38 has a pinion gear 38a in continuous meshing engagement with a ring gear 36, and a pinion shaft 38b operatively coupled to a vehicular propeller shaft (not shown) driven by a vehicular powerplant (not shown), such as an internal combustion engine, through an input yoke 39. Alternatively, a mounting companion flange (not shown) may be attached to a distal end of the pinion shaft 38b (instead of the input yoke 39) for coupling the pinion shaft 38b to the vehicular propeller shaft driven by the vehicular powerplant. The ring gear 36 is conventionally secured to the differential case 34 in any appropriate manner well known in the art.

Therefore, the differential assembly module 20 of the present invention is a self-contained unit wherein the differential carrier frame member 22 supports all the significant elements of the differential assembly and a final drive, such as the differential case 34 housing the differential gear mechanism, differential bearings 35a and 35b, threaded differential adjusters 32a and 32b, differential adjuster locks, oil seals, the drive pinion 38, drive pinion bearings, and the input yoke 39. Preferably, the differential carrier frame member 22 fastened to the central plate section 4 of the support beam member 2 using conventional fasteners, such as bolts 21. The differential carrier frame member 22 of the present invention, illustrated in detail in FIG. 9, improves the modularity of design of the differential assembly, substantially simplifies the assembly and servicing of the differential assembly, and reduces the number of required machining operations.

Figure 6:
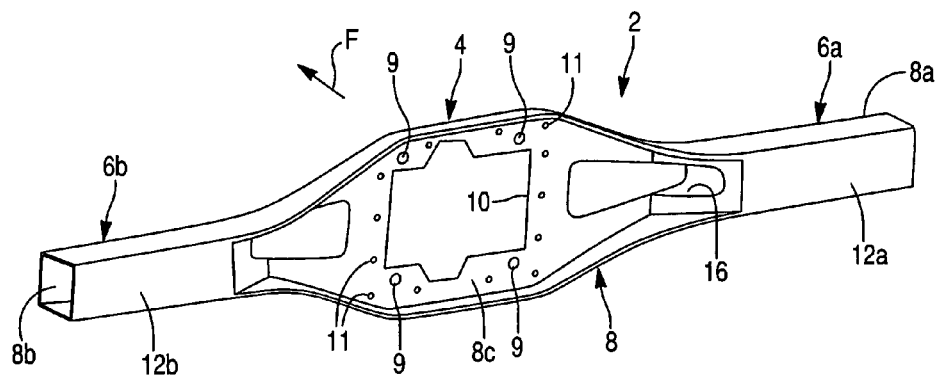
FIG. 6 is a perspective view of a support beam member of the axle assembly in accordance with the first exemplary embodiment of the present invention.

FIG. 6 depicts in detail the support beam member 2 in accordance with the first exemplary embodiment of the present invention. As was explained above, the support beam member 2 has the substantially flat, enlarged central plate section 4 and the two opposite, substantially tubular arm sections 6a and 6b axially outwardly extending from the central plate section 4. Preferably, in this embodiment, the support beam member 2 is formed of a single-piece C-channel body 8 manufactured by a metal deforming, such as stamping, having a substantially flat, enlarged central plate section 8c and two opposite arm sections 8a and 8b axially outwardly extending from the central plate section 8c.

As illustrated in FIG. 6, the flat central plate section 8c of the body 8 is in the form of a substantially vertically oriented flat plate. The enlarged central plate section 8c of the body 8 defines the central plate section 4 of the support beam member 2. The enlarged central plate section 8c has substantially flat front and rear mounting surfaces $8_F$ and $8_R$, respectively. The central plate section 8c is further provided with a central opening 10 therethrough adapted for receiving the differential carrier frame member 22 of the differential assembly module 20.

The support beam member 2 further includes two structural plates 12a and 12b attached to the arm sections 8a and 8b, respectively, in any appropriate manner, such as welding, so as to form the substantially tubular arm sections 6a and 6b of the support beam member 2 housing the axle shaft members 14a and 14b. As shown in FIG. 6, the tubular arm sections 6a and 6b of the support beam member 2 have substantially rectangular cross-section. Inward ends of each of the structural plates 12a and 12b is provided with a notch 16 receiving the axle shaft member 14a or 14b therethrough in a spaced relationship with respect to the central plate section 8c of the body 8 of the support beam member 2.

A plurality of mounting holes 9 are formed in the central plate section 8c adjacent to the central opening 10. The mounting holes 9 are adapted to receive the bolts 21 for fastening the differential carrier frame member 22 to the rear mounting surface $8_R$ of the central plate section 8c of the body 8 of the support beam member 2. Preferably, the mounting holes 9 are smooth, and the plurality of bolts 21 with complementary nuts (not shown) are provided in order to fasten the differential carrier frame member 22 to the flat central plate section 4 of the support beam member 2. Alternatively, each of the mounting holes 9 is provided with a weld-on nut adapted to threadedly engage the complementary bolts 21. Further alternatively, the differential carrier frame member 22 is fastened to the flat central plate section 4 of the support beam member 2 using a plurality of threaded studs (not shown) fixed to the rear mounting surface $8_R$ of the central plate section 8c, in combination with complementary threaded nuts (not shown). Preferably, the threaded studs extend substantially orthogonally to the rear mounting surface $8_R$ of the central plate section 8c.

It will be appreciated that any appropriate manner of securing the differential carrier frame member 22 to the rear mounting surface $8_R$ of the central plate section 8c of the body 8 of the support beam member 2 is within the scope of the present invention.

Figure 7:
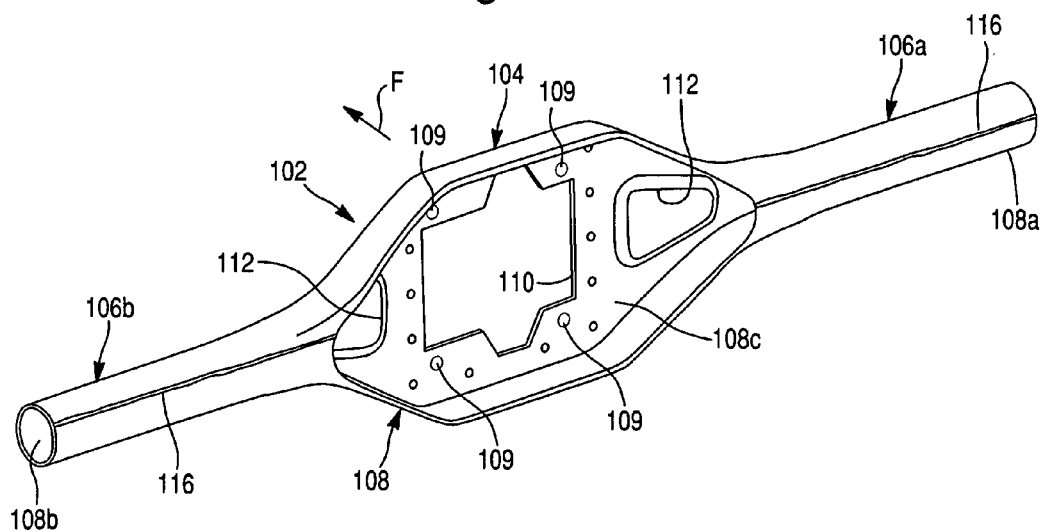
FIG. 7 is a perspective view of the support beam member of the axle assembly in accordance with the second exemplary embodiment of the present invention.

FIG. 7 depicts a second exemplary embodiment of the support beam member of the present invention indicated with the reference numeral 102. As was explained above, the support beam member 102 has a substantially flat, enlarged central section 104 and two opposite arm sections 106a and 106b axially outwardly extending from the central section 104. The support beam member 102 is formed of a single-piece C-channel body 108 manufactured by a metal deforming, such as stamping, having a substantially flat, enlarged central section 108c and two opposite arm sections 108a and 108b axially outwardly extending from the central section 108c.

The substantially flat, enlarged central section 108c of the body 108 defines the central section 104 of the support beam member 102. The flat enlarged central section 108c is further provided with a central opening 110 therethrough adapted for receiving the differential carrier frame member 22 of the differential assembly 20. A plurality of mounting holes 109 are formed in the central plate portion 108c.

The arm sections 108a and 108b of the C-channel body 108 are plastically deformed to form a substantially cylindrical arm sections 106a and 106b with seam welds 116 along a neutral axis of the thereof. The cylindrical arm sections 106a and 106b of the support beam member 102 houses the axle shaft members 14a and 14b (not shown in FIG. 7) in a spaced relationship with respect to the flat central section 108c of the body 108 of the support beam member 102. Those of ordinary skill in the art will appreciate that arm sections 106a and 106b may have many other shapes that could be used for the same purpose, such as elliptical. Thus, the support beam member 102 is formed of a single-piece C-channel body 108.

In order to prevent the differential assembly module 20 from contamination and provide a supply of a lubricant, the differential assembly module 20 is enclosed into a housing formed by a rear cover 40 and a front cover 46 secured to opposite surfaces of the central plate section 4 of the beam member 2 in any appropriate manner well known in the art. In accordance with the preferred embodiment of the present invention, both the rear cover 40 and the front cover 46 are manufactured by metal stamping of any appropriate metal material, such as steel. Preferably, the front cover 46 is welded to a front surface of the central plate section 4 of the beam member 2, while the rear cover 40 is fastened to a rear surface of the central plate section 4 of the beam member 2 using conventional fasteners. The front cover 46 has a front opening 48 (shown in FIGS. 4 and 5) for receiving therethrough a distal end of the pinion shaft 38b of the drive pinion 38. As illustrated in FIGS. 4 and 5, the front opening 48 is formed by a front flange collar 49a provided with a plurality of through holes 49' spaced apart substantially circumferentially, equidistantly around the front opening 48. The front cover 46 is further provided with a rear flange 49b adapted to juxtapose a front surface of the central plate section 4 of the beam member 2.

The rear cover 40 is provided with a mounting flange 43 adapted to juxtapose the rear mounting surface of the central plate section 4 of the beam member 2. As illustrated in FIG. 4, the mounting flange 43 of the rear cover 40 is provided with a plurality of spaced apart through holes 43' adapted to receive a plurality of threaded fasteners 41.

Figure 10:
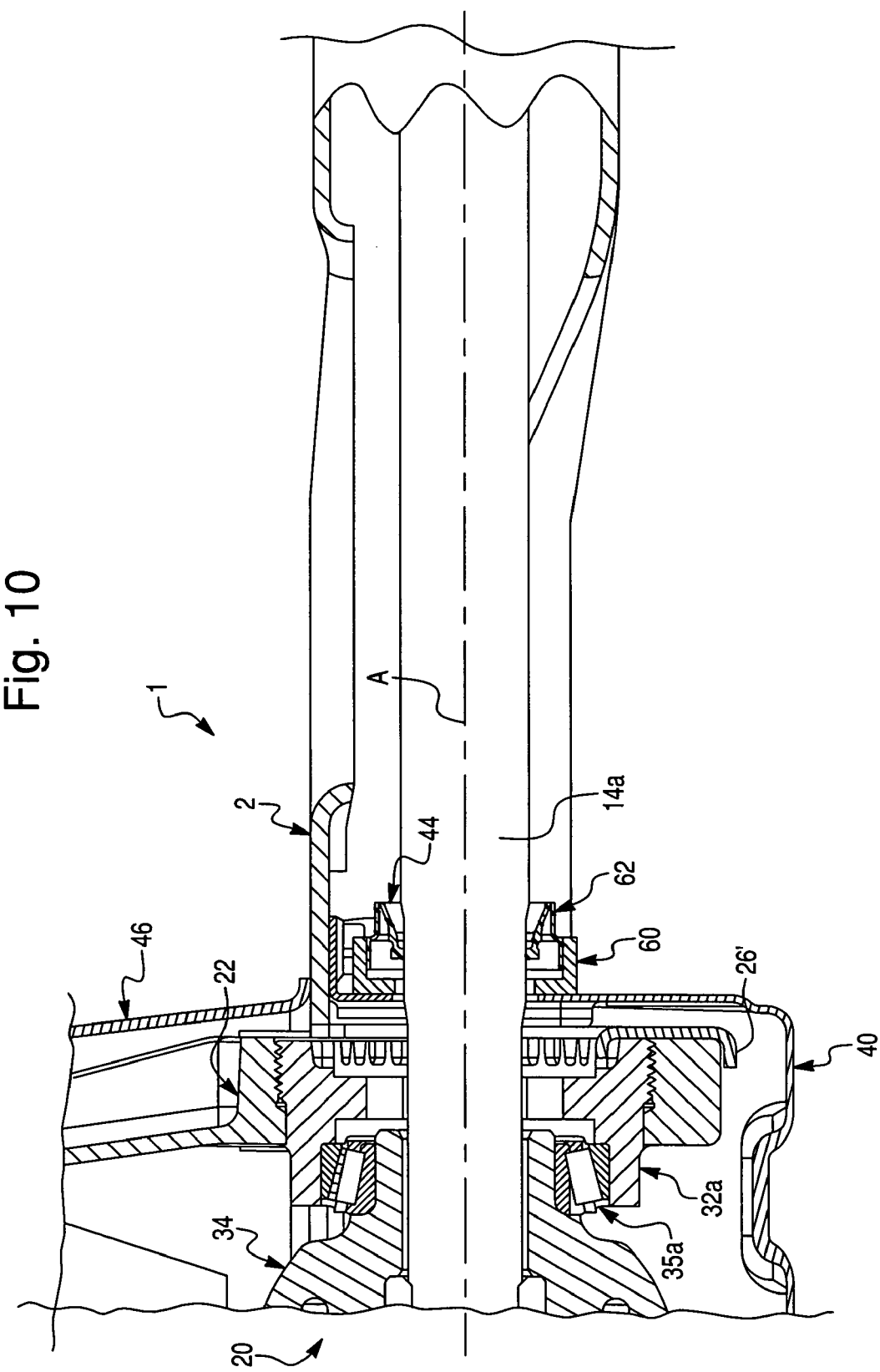
FIG. 10 is a partial sectional view of the drive axle assembly in accordance with the preferred embodiment of the present invention.
Figure 11:
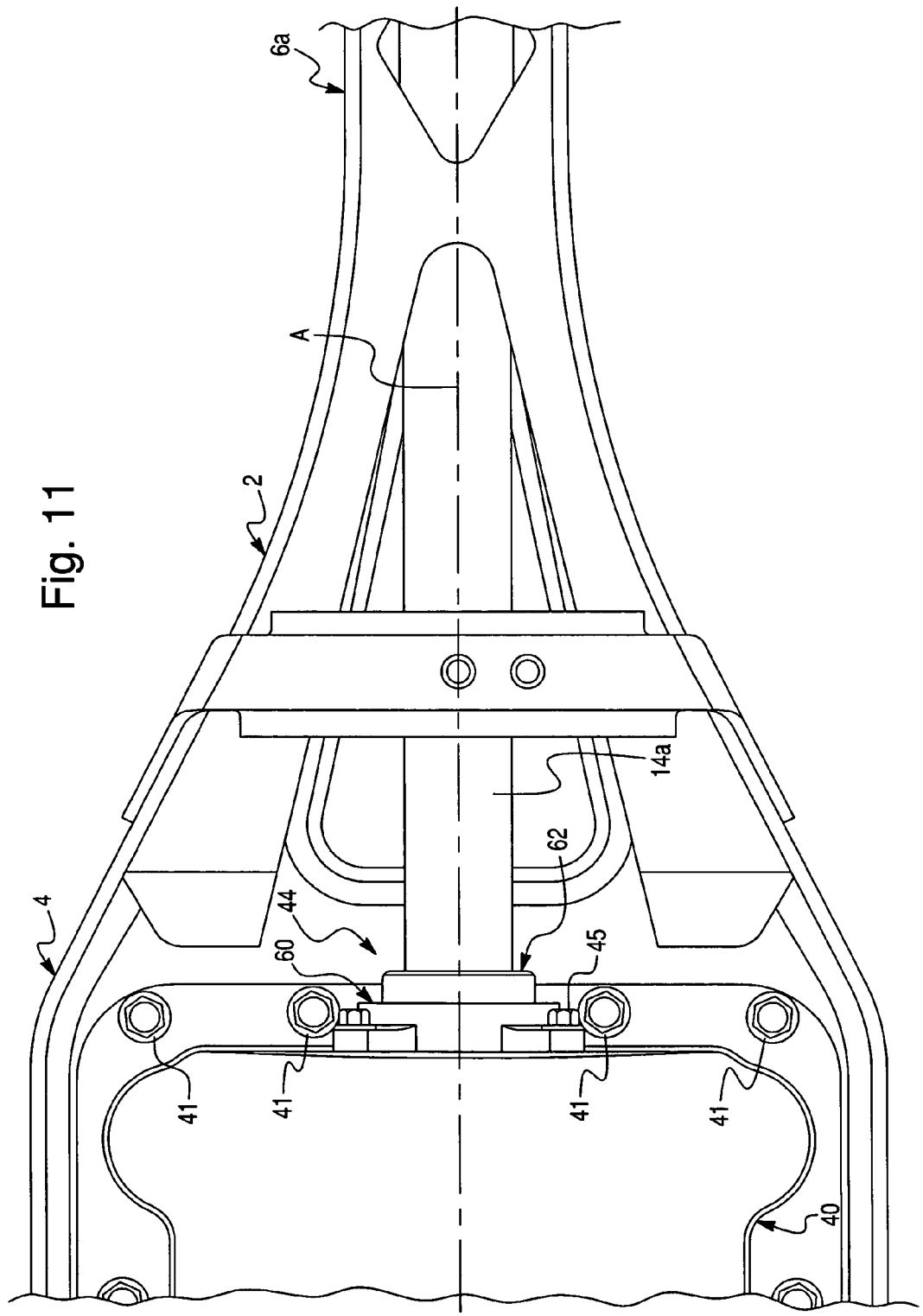
FIG. 11 is a partial rear view of the drive axle assembly in accordance with the preferred embodiment of the present invention.

As shown in FIGS. 4 and 5, the rear cover 40 incorporates two opposite access openings 42 (only one is shown in FIG. 4) for receiving the axle shaft members 14a and 14b therethrough. Each of the access openings 42 is provided with an adjustable sealing flange device 44 provided to seal an interior cavity within the rear cover 40 between the access opening 42 and the axle shaft member 14a or 14b, as shown in FIGS. 4 and 10. Each of the axle shaft members 14a and 14b has a first central axis of rotation A depicted in FIGS. 10 and 11. The adjustable sealing flange device 44 is fastened to the rear cover 40 about the access openings 42 by means of a set of fasteners 45, as shown in FIGS. 4 and 11. The fasteners 45 extend through corresponding holes 42' provided in the rear cover 40 about the access openings 42. Preferably, the fasteners 45 are screws, and each the holes 42' is provided with a weld-on nut (not shown) adapted to threadedly engage the corresponding screws 45. Alternatively, each of the holes 42' is threaded to engage the corresponding screws 45.

As further illustrated in FIG. 10, the axle shaft members 14a and 14b are supported for rotation within the differential assembly module 20 by the differential bearings 35a and 35b with the sealing flange devices 44 disposed outboard of the differential bearings 35a and 35b. Alignment of the differential bearings 35a and 35b (thus, the axle shaft members 14a and 14b) with the sealing flange devices 44 is critical for bearing life and proper sealing of the rear cover 40. However, due to accumulative slack of tolerances through the front cover 46, the support beam member 2, the differential assembly module 20 and the rear cover 40, the required alignment of the sealing flange devices 44 to the axle shaft members 14a and 14b is extremely difficult to attain.

Figure 12:
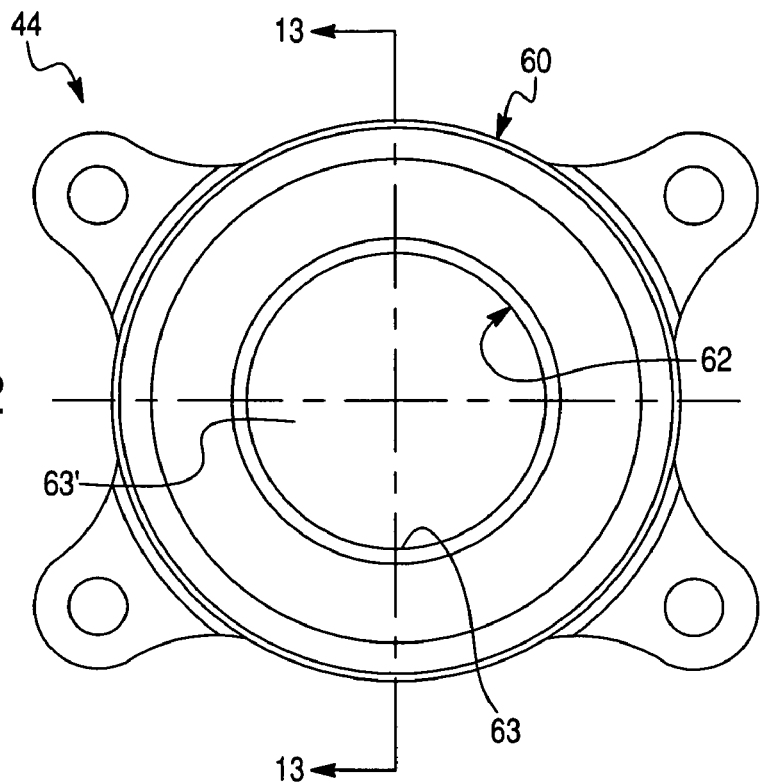
FIG. 12 is a front view of an adjustable sealing flange device in accordance with the preferred embodiment of the present invention.
Figure 13:
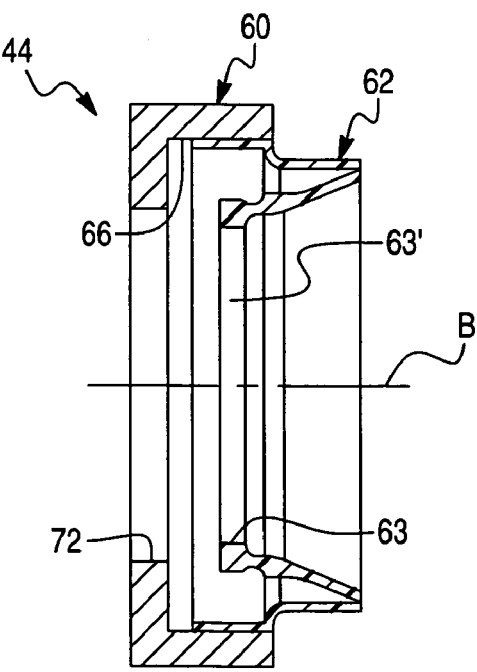
FIG. 13 is a cross-sectional view of the adjustable sealing flange device in accordance with the preferred embodiment of the present invention, taken along the line 13—13 of FIG. 12.

In order to overcome this problem, the sealing flange devices 44 is designed to be adapted to adjust a position of the sealing flange device 44 relative to the access opening 42 of the rear cover 40. More specifically, the adjustable sealing flange device 44, illustrated in detail in FIGS. 12 and 13, comprises a housing 60 supporting a substantially annular seal member 62 having a second central axis of symmetry B. As illustrated in detail in FIGS. 14 and 15, the housing 60 includes a body 64 having a substantially cylindrical inner peripheral surface 66 provided for receiving and supporting the seal member 62, and a number of mounting legs 68 each provided with a mounting through hole 70 adapted to receive one of the fasteners 45. An inner peripheral surface 63 of the seal member 62 sealingly engages an outer peripheral surface of one of the axle shaft members 14a and 14b and forms an axle bore 63' to receive one of the axle shaft members 14a and 14b, as shown in FIGS. 10, 12 and 13. Preferably, the seal member 62 is press-fit into the inner peripheral surface 66 of the housing 60. It will be appreciated by those skilled in the art that the seal member 62 may be secured to the inner peripheral surface 66 of the housing 60 by any other appropriate manner, such as adhesive bonding. The body 64 of the housing 60 is further provided with a through opening 72 adapted for receiving the axle shaft member 14a or 14b therethough and substantially coaxial with the cylindrical, inner peripheral surface 66.

Figure 14:
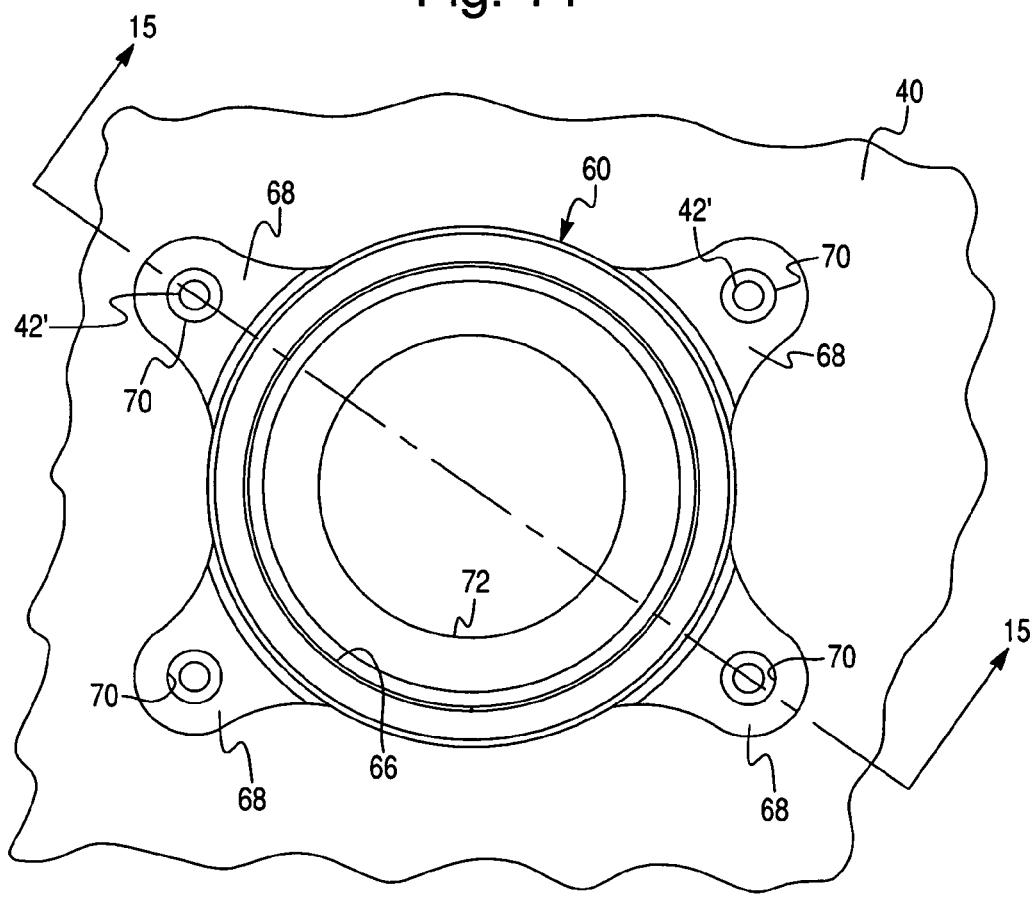
FIG. 14 is a front view of a housing of the adjustable sealing flange device juxtaposed to the rear cover of the axle assembly of the present invention.
Figure 15:
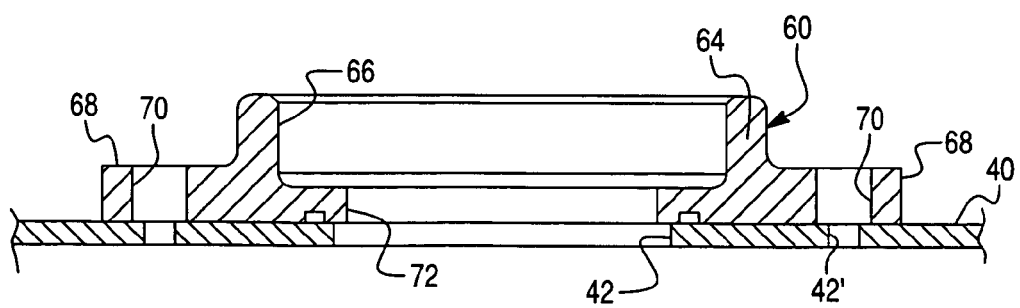
FIG. 15 is a cross-sectional view of the housing of the adjustable sealing flange device juxtaposed to the rear cover of the axle assembly of the present invention, taken along the line 15—15 of FIG. 14.

As further illustrated in FIGS. 14 and 15, the mounting holes 70 of the mounting legs 68 of the housing 60 are oversized, or substantially larger in diameter than the holes 42' in the rear cover 40 allowing free movement of the housing 60 about the fasteners 45 in order to enable positional adjustment of the sealing flange device 44 relative to the rear cover 40, thus achieving a desired relative position of the seal member 62 and the rear cover 40 so that the seal member 62 is positioned substantially coaxially (aligned) with the axle shaft member 14a or 14b.

Upon assembly of the drive axle assembly 1, first, the differential assembly module 20 is assembled by mounting and securing the differential case 34 housing a differential gear mechanism and the drive pinion 38 to the differential carrier frame member 22. Then, the fully assembled differential assembly module 20 is secured to the support beam member 2 by fastening the differential carrier frame member 22 to the rear mounting surface $8_R$ of the support beam member 2. Next, the front cover 46 is placed over the neck portion 24 of the differential carrier frame member 22 of the differential assembly module 20 and secured to the front mounting surface $8_F$ of the support beam member 2. Then, the rear cover 40 is fastened to the rear mounting surface $8_R$ of the axle support beam member 2 to cover a rear part of the differential assembly module 20. Afterward, the adjustable sealing flange devices 44 are secured to the rear cover 40 with fasteners 45. The fasteners 45 are first tightened finger tight, then backed off one half turn. Next, a dummy axle shaft is inserted into the access opening 42 of the rear cover 40 through the adjustable sealing flange devices 44 for engagement with a side gear (not shown) of the differential assembly module 20. As the dummy axle shaft engages the side gear, it moves the adjustable sealing flange devices 44 relative to the access opening 42 of the rear cover 40 allowed by the oversize mounting holes 70 in the housing 60 that permit to move the sealing flange devices 44 about the fasteners 45 and align the sealing flange device 44 to the axle shaft member 14a or 14b. Finally, the fasteners 45 torqued to specification to maintain the desired position of the sealing flange device 44, and the dummy axle shaft is removed.

The support beam member 2 further includes a plurality of smaller mounting holes 11 formed in the central plate section 8c of the body 8 adjacent to the central opening 10 for receiving the screws 41 adapted to fasten the rear cover 40 to the central plate section 4 of the support beam member 2. Preferably, the mounting holes 11 are provided with threads complementary to threads of the screws 41. Alternatively, the mounting holes 11 may be smooth, and a plurality of bolts with complementary nuts (not shown) are provided in order to fasten the rear cover 40 to the flat central plate section 4 of the support beam member 2. It will be appreciated that any appropriate manner of securing the rear cover 40 to the rear mounting surface $8_R$ of the central plate section 8c of the body 8 of the support beam member 2 is within the scope of the present invention.

Figure 9:
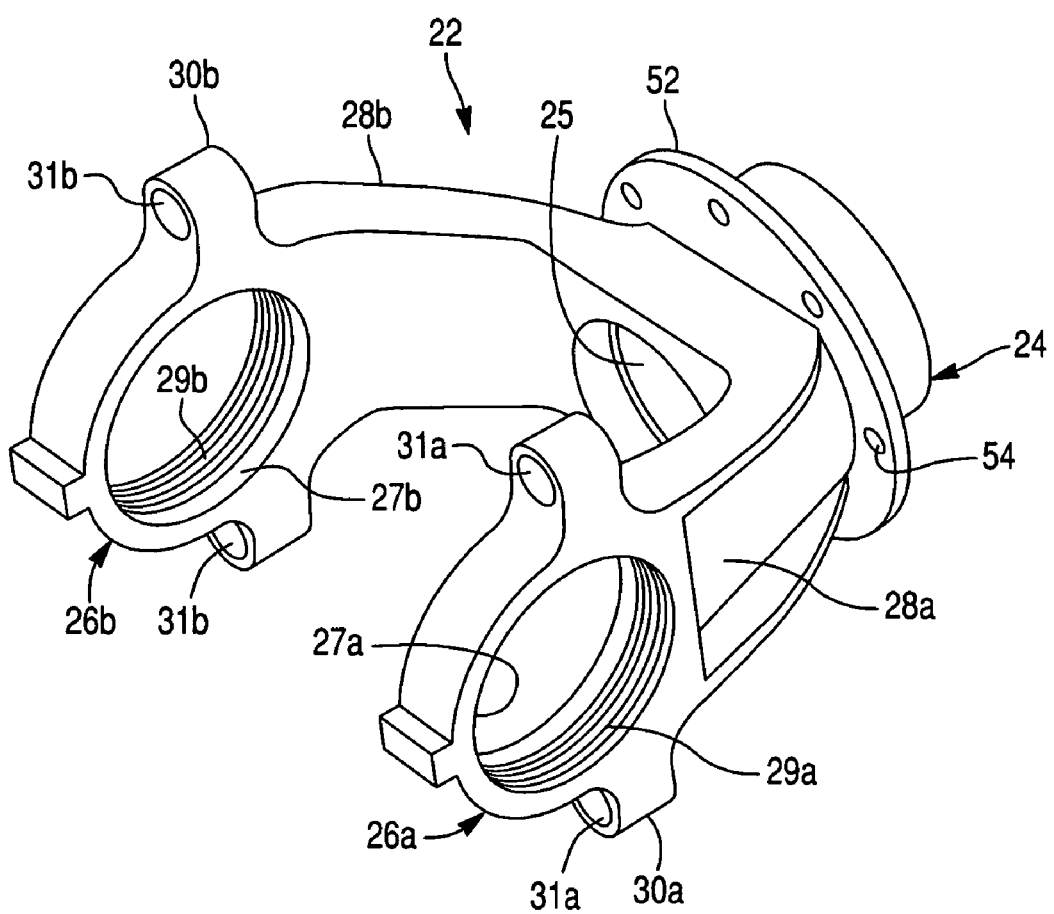
FIG. 9 is perspective view of a differential carrier frame member in accordance with the present invention.

The differential carrier frame member 22, illustrated in detail in FIG. 9, is, preferably, a single-piece metal part manufactured by casting or forging. The differential carrier frame member 22 has a generally Y-shaped configuration and includes a neck portion 24 and two opposite, axially spaced, coaxial bearing hub portions 26a and 26b attached to the neck portion 24 through respective leg portions 28a and 28b. The neck portion has an opening 25 therethrough adapted for receiving and rotatably supporting the drive pinion 38 through an appropriate anti-friction bearing (not shown), preferably a tapered roller bearing. The bearing hub portions 26a and 26b are provided with respective openings 27a and 27b therethrough adapted for receiving appropriate anti-friction bearings 35a and 35b for rotatably supporting the differential carrier 34. Moreover, an inner peripheral surface of each of the openings 27a and 27b has threads 29a and 29b in order to receive the threaded adjusting ring 32a or 32b, respectively. Each adjusting ring 32a or 32b is threadedly engaged with the threaded openings 27a and 27b in the bearing hub portions 26a and 26b of the differential carrier frame member 22. Preferably, the anti-friction bearings 35a and 35b are tapered roller bearings.

Furthermore, the bearing hub portions 26a and 26b are provided with mounting flange portions 30a and 30b respectively, for fastening the differential carrier frame member 22 to the rear mounting surface $8_R$ of the flat central plate section 4 of the support beam member 2. Preferably, each of the mounting flange portions 30a and 30b has two mounting holes 31a and 31b, respectively, adapted to receive the screws 21. In an assembled condition of the drive axle assembly 1, the screws 21 extend through the mounting holes 31a and 31b in the differential carrier frame member 22 and threaded into the mounting holes 9 formed in the central plate section 8c of the body 8, thus fastening the differential carrier frame member 22 of the differential assembly module 20 to the central plate section 4 of the beam member 2. It will be appreciated that a geometric location of the mounting holes 9 in the central plate section 8c of the body 8 is substantially complementary to location the mounting holes 31a and 31b of the mounting flange portions 30a and 30b of the differential carrier frame member 22.

Alternatively, if the mounting holes 9 are smooth, the bolts extend through the mounting holes 31a and 31b in the differential carrier frame member 22 and the mounting holes 9 to extend through the central plate section 8c of the body 8, and are threaded with the complementary nuts (or weld-on nuts) on the opposite side of the central plate section 8c, thus fastening the differential carrier frame member 22 to the central plate section 4 of the beam member 2.

Further alternatively, if the central plate section 8c of the body 8 of the support beam member 2 is provided with the plurality of the threaded studs extending rearwardly from the rear mounting surface $8_R$ of the central plate section 8c, the differential carrier frame member 22 is mounted to the central plate section 4 of the beam member 2 by the threaded studs extending through the mounting holes 31a and 31b in the differential carrier frame member 22, and fastened to the central plate section 4 of the beam member 2 with the complementary nuts. It will be appreciated that a geometric location of the threaded studs is substantially complementary to location the mounting holes 31a and 31b of the mounting flange portions 30a and 30b of the differential carrier frame member 22.

As further illustrated in FIG. 9, the neck portion 24 of the differential carrier frame member 22 has a substantially annular flange member 52 provided with a plurality of holes 54 spaced apart substantially circumferentially, equidistantly around the flange member 52. Preferably, the holes 54 are threaded. It will be appreciated that a geometric location of the through holes 54 is substantially complementary to location the through holes 49' of the front flange collar 49a of the front cover 46.

Therefore, the axle assembly in accordance with the present invention includes a novel adjustable sealing flange device for sealing the interior cavity within the rear cover of the drive axle assembly between the access opening and the axle shaft member. The present invention considerably improves quality and reliability of the differential assembly module of the drive axle assembly.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A drive axle assembly for a motor vehicle, said axle assembly comprising:
    a support beam member having a substantially flat central plate section;
    a differential assembly module secured to said flat central plate section of said support beam member;
    a pair of axle shaft members outwardly extending from said differential assembly module; and
    a cover member fastened to said flat central plate section of said support beam member to cover at least a portion said differential assembly module, said cover member having at least one access opening therein for receiving one of said axle shaft members therethrough;
    said at least one access opening in said cover member provided with an adjustable sealing flange device to seal an interior cavity within said cover member between said at least one access opening and one of said axle shaft members extending therethrough;
    said adjustable sealing flange device being adjustable relative to said cover member.

2. The drive axle assembly for the motor vehicle as defined in claim 1, wherein each of said axle shaft members has a first central axis of rotation and said sealing flange device has a second central axis; and wherein said adjustable sealing flange device is adjustable relative to said cover member to align said second central axis of said sealing flange device to said first central axis of one of said axle shaft members.

3. The drive axle assembly for the motor vehicle as defined in claim 1, wherein said cover member has a plurality of holes adjacent to said at least one access opening, and said sealing flange device includes a corresponding plurality of mounting holes, said drive axle assembly further includes a plurality of fasteners adapted to extend through said holes in said cover member and said mounting holes in said sealing flange device for fastening said sealing flange device to said cover member.

4. The drive axle assembly for the motor vehicle as defined in claim 3, wherein said mounting holes in said sealing flange device are substantially larger in diameter than said holes in said cover member allowing free movement of said sealing flange device about said fasteners in order to enable positional adjustment of said sealing flange device relative to said cover member.

5. The drive axle assembly for the motor vehicle as defined in claim 4, wherein said sealing flange device includes a housing supporting a seal member, said seal member sealingly engages one of said axle shaft members.

6. The drive axle assembly for the motor vehicle as defined in claim 5, wherein said mounting holes in said sealing flange device are formed in said housing of said sealing flange device.

7. The drive axle assembly for a motor vehicle as defined in claim 1, wherein said cover member is a rear cover secured to a rear mounting surface of said flat central plate section of said support beam member.

8. The drive axle assembly for a motor vehicle as defined in claim 1, further including a front cover secured to a front mounting surface of said flat central plate section of said support beam member.

9. The drive axle assembly for the motor vehicle as defined in claim 1, wherein said cover member has two coaxially spaced access openings therein for receiving said axle shaft members therethrough; and wherein each of said access openings is provided with said adjustable sealing flange device to seal said interior cavity within said cover member between one of said access openings and corresponding one of said axle shaft members extending therethrough.

10. A drive axle assembly for a motor vehicle, said axle assembly comprising:

a support beam member having a substantially flat central plate section;

a differential assembly module secured to said flat central plate section of said support beam member;

a pair of axle shaft members outwardly extending from said differential assembly module; and a cover member fastened to said flat central plate section of said support beam member to cover at least a portion said differential assembly module, said cover member has two coaxially spaced access openings therein for receiving said axle shaft members therethrough;

each of said access openings is provided with an adjustable sealing flange device to seal an interior cavity within said cover member between one of said access openings and corresponding one of said axle shaft members extending therethrough;

said adjustable sealing flange device being adjustable relative to said cover member.

11. The drive axle assembly for the motor vehicle as defined in claim 10, wherein each of said axle shaft members has a first central axis of rotation and said sealing flange device has a second central axis; and wherein said adjustable sealing flange device is adjustable relative to said cover member to align said second central axis of said sealing flange device to said first central axis of one of said axle shaft members.

12. The drive axle assembly for the motor vehicle as defined in claim 10, wherein said cover member has a plurality of holes adjacent to said at least one access opening, and said sealing flange device includes a corresponding plurality of mounting holes, said drive axle assembly further includes a plurality of fasteners adapted to extend through said holes in said cover member and said mounting holes in said sealing flange device for fastening said sealing flange device to said cover member.

13. The drive axle assembly for the motor vehicle as defined in claim 12, wherein said mounting holes in said sealing flange device are substantially larger in diameter than said holes in said cover member allowing free movement of said sealing flange device about said fasteners in order to enable positional adjustment of said sealing flange device relative to said cover member.

14. The drive axle assembly for the motor vehicle as defined in claim 13, wherein said sealing flange device includes a housing supporting a seal member, said seal member sealingly engages one of said axle shaft members.

15. The drive axle assembly for the motor vehicle as defined in claim 14, wherein said mounting holes in said sealing flange device are formed in said housing of said sealing flange device.

16. The drive axle assembly for a motor vehicle as defined in claim 10, wherein said cover member is a rear cover secured to a rear mounting surface of said flat central plate section of said support beam member.

17. The drive axle assembly for a motor vehicle as defined in claim 16, further including a front cover secured to a front mounting surface of said flat central plate section of said support beam member.

18. A drive axle assembly for a motor vehicle, said axle assembly comprising:

a support beam member;

a differential assembly module including a differential carrier member secured to said support beam member, said carrier member rotatably supporting a differential case of said differential assembly module;

a pair of axle shaft members outwardly extending from said differential assembly module; and a cover member fastened to said support beam member to cover at least a portion said differential assembly module, said cover member having at least one access opening therein for receiving one of said axle shaft members therethrough;

said at least one access opening in said cover member provided with an adjustable sealing flange device to seal an interior cavity within said cover member between said at least one access opening and one of said axle shaft members extending therethrough;

said adjustable sealing flange device being adjustable relative to said cover member.

19. The drive axle assembly for the motor vehicle as defined in claim 18, wherein said differential carrier member and said cover member are mounted to a flat central plate section of said support beam member.

* * * * *